(12) United States Patent
Costello et al.

(10) Patent No.: US 7,717,156 B2
(45) Date of Patent: May 18, 2010

(54) DEVICE FOR CREATING AN ADJUSTABLE ANGULAR FORCE

(75) Inventors: Philip G. Costello, North Haven, CT (US); Mehieddine Rababeh, Dearborn, MI (US); Charles K. Rogers, Warren, MI (US); Ronald D. Stebbeds, Jr., Saint Clair Shores, MI (US)

(73) Assignee: Barnes Group inc., Bristol, CT (US)

( * ) Notice: Subject to any disclaimer, the term of this patent is extended or adjusted under 35 U.S.C. 154(b) by 471 days.

(21) Appl. No.: 11/023,180

(22) Filed: Dec. 28, 2004

(65) Prior Publication Data

US 2006/0137837 A1    Jun. 29, 2006

(51) Int. Cl.
*A47G 5/02* (2006.01)
(52) U.S. Cl. .................................. 160/317; 160/318
(58) Field of Classification Search ................. 160/317, 160/191, 192, 370.22, 313, 316, 323.1, 170, 160/171, 318; 267/180, 167; 296/37.16, 296/97.8; 242/371, 372
See application file for complete search history.

(56) References Cited

U.S. PATENT DOCUMENTS

| | | | | |
|---|---|---|---|---|
| 102,409 | A | * | 4/1870 | Knapp et al. ................. 160/299 |
| 270,469 | A | * | 1/1883 | Parrett .......................... 160/28 |
| 1,235,092 | A | * | 7/1917 | Atkinson et al. .......... 242/375.1 |
| 1,266,716 | A | * | 5/1918 | Rolland ....................... 160/23.1 |
| 1,392,918 | A | * | 10/1921 | Cornell ........................ 160/312 |
| 1,941,880 | A | * | 1/1934 | Earll ........................... 242/382 |
| 2,098,016 | A | * | 11/1937 | Schuetz ....................... 160/288 |
| 2,485,385 | A | * | 10/1949 | Komassa ..................... 242/372 |
| 2,696,250 | A | * | 12/1954 | Michelman ................. 160/315 |
| 3,929,210 | A | * | 12/1975 | Cutler et al. ............. 191/12.2 R |
| 4,139,231 | A | * | 2/1979 | Lang et al. ................. 296/37.16 |
| 5,201,897 | A | * | 4/1993 | Whiting ....................... 267/155 |

(Continued)

FOREIGN PATENT DOCUMENTS

DE          509237          9/1930

(Continued)

OTHER PUBLICATIONS

Barnes Group Inc., European Search Report, Munich, Apr. 26, 2006, EP 05 02 8473.

*Primary Examiner*—David Purol
(74) *Attorney, Agent, or Firm*—Fay Sharpe LLP; Brian E. Turung (57) ABSTRACT

A device for creating an angular biasing force for the roller tube of a security shade, which roller tube is mounted to a fixed structure of a vehicle. The device comprises an element attached to the fixed structure of the vehicle and a plurality of force units, each including a torsion spring exerting a biasing force between the structure and the roller tube, wherein the torsion springs each have a first inner end associated with the fixed structure and a second outer end associated with the roller tube so the torsion biasing force of each spring is in a direction from the fixed structure to the roller tube. The total angular force of the device is the sum of the biasing forces of all of the torsion spring force units when the units are connected in parallel. When connected in series, the magnitude of angular rotation is the sum of the angle of rotation of all units.

44 Claims, 8 Drawing Sheets

U.S. PATENT DOCUMENTS

| | | | | |
|---|---|---|---|---|
| 5,271,446 | A | * | 12/1993 | Hwang .................. 160/23.1 |
| 5,275,223 | A | * | 1/1994 | Magro et al. ............. 160/191 |
| 5,284,199 | A | * | 2/1994 | Finch et al. .............. 160/133 |
| 5,464,052 | A | | 11/1995 | Wieczorek |
| 5,934,354 | A | * | 8/1999 | Price et al. ........... 160/370.22 |
| 5,964,426 | A | * | 10/1999 | Tabellini .................. 242/372 |
| 6,012,506 | A | * | 1/2000 | Wang et al. ............. 160/170 |
| 6,131,643 | A | * | 10/2000 | Cheng et al. ......... 160/370.22 |
| 6,279,639 | B1 | * | 8/2001 | Schlecht et al. ......... 160/23.1 |
| 6,283,192 | B1 | * | 9/2001 | Toti ......................... 160/170 |

FOREIGN PATENT DOCUMENTS

| | | |
|---|---|---|
| DE | 509237 | 10/1930 |
| EP | 0 446049 | 9/1991 |
| EP | 0446 049 A2 | 9/1991 |
| EP | 1 251 021 A1 | 4/2002 |
| EP | 1251021 | 4/2002 |
| EP | 1 676 748 | 10/2007 |
| FR | 2 621 069 | 11/1987 |
| FR | 2621069 | 3/1989 |
| JP | 9-183308 | 7/1997 |

\* cited by examiner

DEVICE FOR CREATING AN ADJUSTABLE ANGULAR FORCE

The present invention relates to a device for creating an angular biasing force and especially such a device for use with a security shade covering the cargo area of a motor vehicle to prevent viewing into the cargo area.

INCORPORATION BY REFERENCE

In many styles of motor vehicles, a rear compartment or cargo area is provided for storing personal items. To discourage viewing of the cargo area, motor vehicle manufacturers typically provide a retractable security shade or flexible panel that can be extended to cover the cargo area and prevent anyone outside the vehicle from readily viewing stored articles. The device for connecting the roller tube of the security shade onto the transversely spaced sides of the cargo area routinely include a mechanism to rotationally bias the roller tube at each end so the shade tends to be in the retracted stored condition. These devices at each end of the shade often include a torsion spring for biasing the roller tube in the rotational direction for storing the shade. Such devices are shown in Wieczorek U.S. Pat. No. 5,464,052 and Price U.S. Pat. No. 5,934,354. These two patents are incorporated by reference as background information and showing the type of mechanism to which the present invention is directed.

BACKGROUND OF INVENTION

The normal shade retraction devices or mechanisms used in the automobile industry employ a single torsion spring at each end to exert the retraction biasing force on the roller tube supporting the security shade. Consequently, a different device with a different coefficient of rotational force is required for each of the various security shade installations. A different torsion spring is required to provide a different biasing force in the rotational direction. This situation necessitated engineering different torsional spring designs and modification of the volume or cavity used to mount the different sized torsion springs. Furthermore, the magnitude of angular rotation is also fixed at a given angle by the construction of the torsion spring at each end of the shade. Thus, each torsion spring was designed for a particular motor vehicle and the surrounding mechanism for mounting the security shade was custom designed for each installation. This presents substantial engineering costs and a need for a large inventory of different torsion spring designs and different housings for devices using the different sized torsion springs. The custom designed torsion spring requirement also impacts the aftermarket. For instance, if a security shade is to be mounted in a particular motor vehicle, the aftermarket must provide a full host of different spring designs. Such lack of uniformity complicated the aftermarket and also increased the OEM cost and the device inventory requirements. As can be appreciated, there is a need for solving the problems associated with the diverse needs of devices to create a rotational force and angular movement to retract a security shade of the type now becoming quite popular. The prior art units increased the size of the housing at each end of the shade.

THE INVENTION

The present invention relates to a device for creating an angular biasing force overcoming the problems associated with prior torsion spring mechanisms used in the automobile industry for retracting security shades. In accordance with the invention, a plurality of force units each involving a separate torsion spring are combined to adjust the total angular biasing force and/or the amount of rotation of a device of the type used in creating a biasing force for a security shade.

In accordance with the present invention, there is provided an improved device for creating an angular biasing force for a roller tube of a security shade where the roller tube is a standard member rotatably mounted in a fixed inside structure of a motor vehicle. In accordance with the invention, the device at each end of the shade includes an element attached to the fixed side structure of a vehicle and a plurality of force units each including a torsion spring exert a biasing force between the fixed structure of the vehicle and the roller tube of the security shade. Each of the torsion springs of the spaced devices has a first inner end associated with the fixed vehicle structure and a second outer end associated with the roller tube so the torsion biasing force of the spring is in a direction from the fixed structure to the roller tube. When the springs are mounted in parallel, the total angular force of the device is the sum of the biasing forces of all the torsion spring force units. In the preferred embodiment, the torsion springs are connected from the first end to the second end in series. In this manner, the amount of rotation available during extension of the shade is adjusted by the number of series springs. Both concepts provide a biasing force equal to the force of a plurality of torsion springs.

In accordance with a feature of the present invention, a selected number of torsion spring force units are used to adjust either the total angular biasing force or the amount of rotation available. Consequently, the biasing force or angular rotation of the device can be adjusted by selecting the number of torsion spring force units. There is no need to provide springs having different force coefficients, different amount of rotation and different dimensions for each security shade installation. To increase force, the springs are connected in parallel. To increase the angle of rotation, the springs are connected in series. This is the preferred design.

When the force units involve torsion springs connected in parallel, the roller tube has an end housing with an inner cylindrical surface and each of the torsion spring force units has a support housing or spring receptacle with an outer cylindrical surface slidable in the inner cylindrical surface of the end housing for the roller tube. A fastener is used to selectively attach the force units to the end housing. The total force is thereby easily adjusted by adding or subtracting to the number of force units. When the torsion spring force units are connected in series, the roller tube still has the same end housing with an inner cylindrical surface and each of the torsion spring force units still has a support housing or spring receptacle with an outer cylindrical surface slidable in the inner cylindrical surface of the end housing of the roller tube. However, when the torsion units are connected in series, a fastener unit is attached to the last of the force units in the series of force units to connect the last unit with the end housing of the roller tube by the fastener unit. In this embodiment of the invention, the total angular rotation is a summation of the rotational travel of the plurality of torsion spring force units used in the device.

The primary object of the present invention is the provision of a device for creating an angular force, which device utilizes a plurality of force units based upon torsional springs where the number of units can be varied to change the angular rotation and/or the angular biasing force.

Yet another object of the present invention is the provision of a device for creating angular force, as defined above, which device involves the plurality of torsion springs connected in series or in parallel to add the torsional coefficient of force of the springs to obtain a total angular biasing force or to add the rotational displacement.

Another object of the present invention is the provision of a device for creating an adjustable biasing force or rotation, as defined above, which device can be used for retracting a security shade for the cargo compartment of a motor vehicle.

Still a further object of the present invention is the provision of a device for creating an angular force, as defined above, which device utilizes a series of force units based upon torsional springs wherein the number of torsional units can be changed to adjust the total angular rotation wherein the force units are easy to manufacture and duplicative in design.

These and other objects and advantages will become apparent from the following description taken together with the accompanying drawings.

PREFERRED EMBODIMENT

Figures 1, 3:
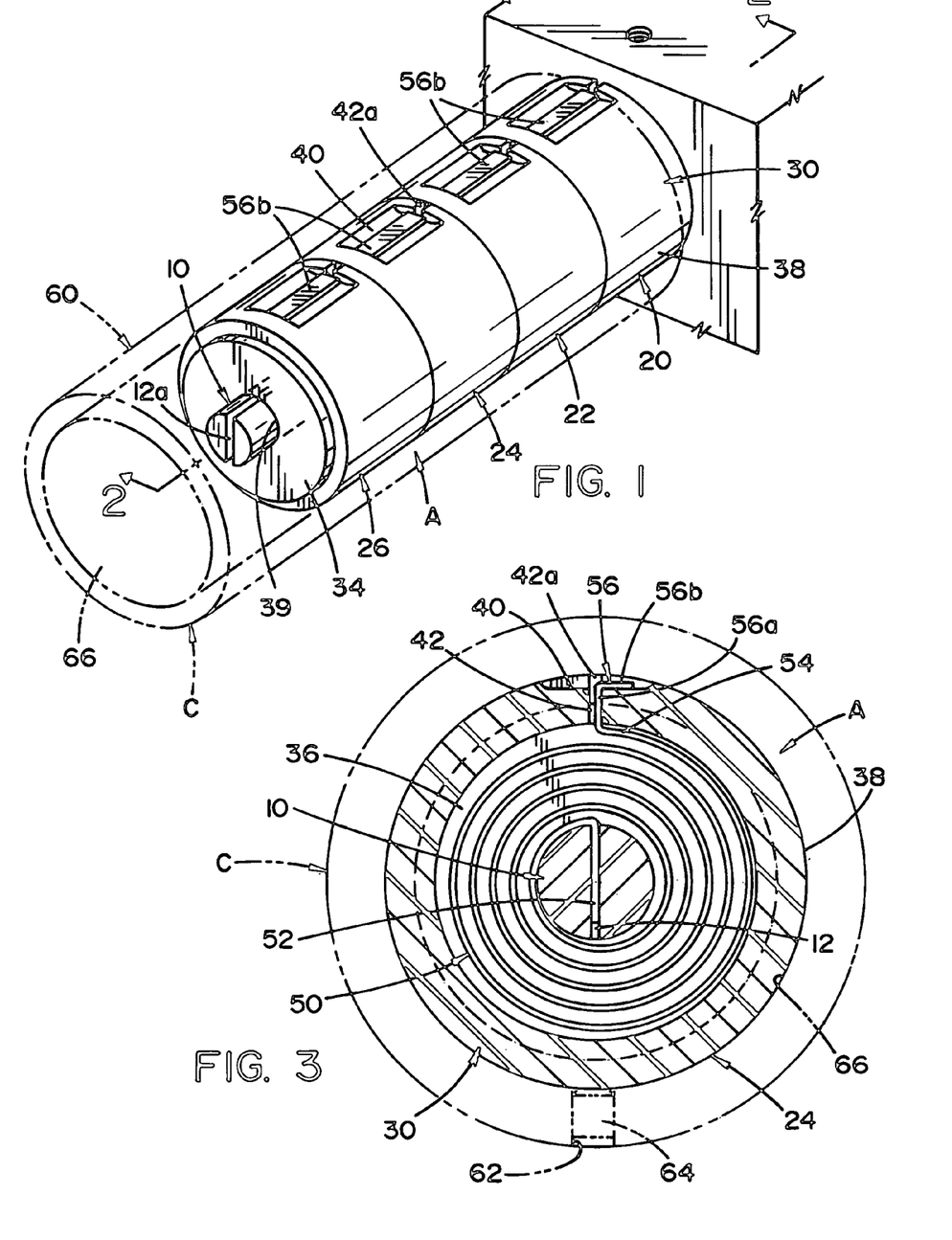
FIG. 1 is a pictorial view of the first embodiment of the invention wherein the force units are connected in parallel.
FIG. 3 is an enlarged cross-sectional view taken generally along line 3-3 of FIG. 2.
Figure 2:
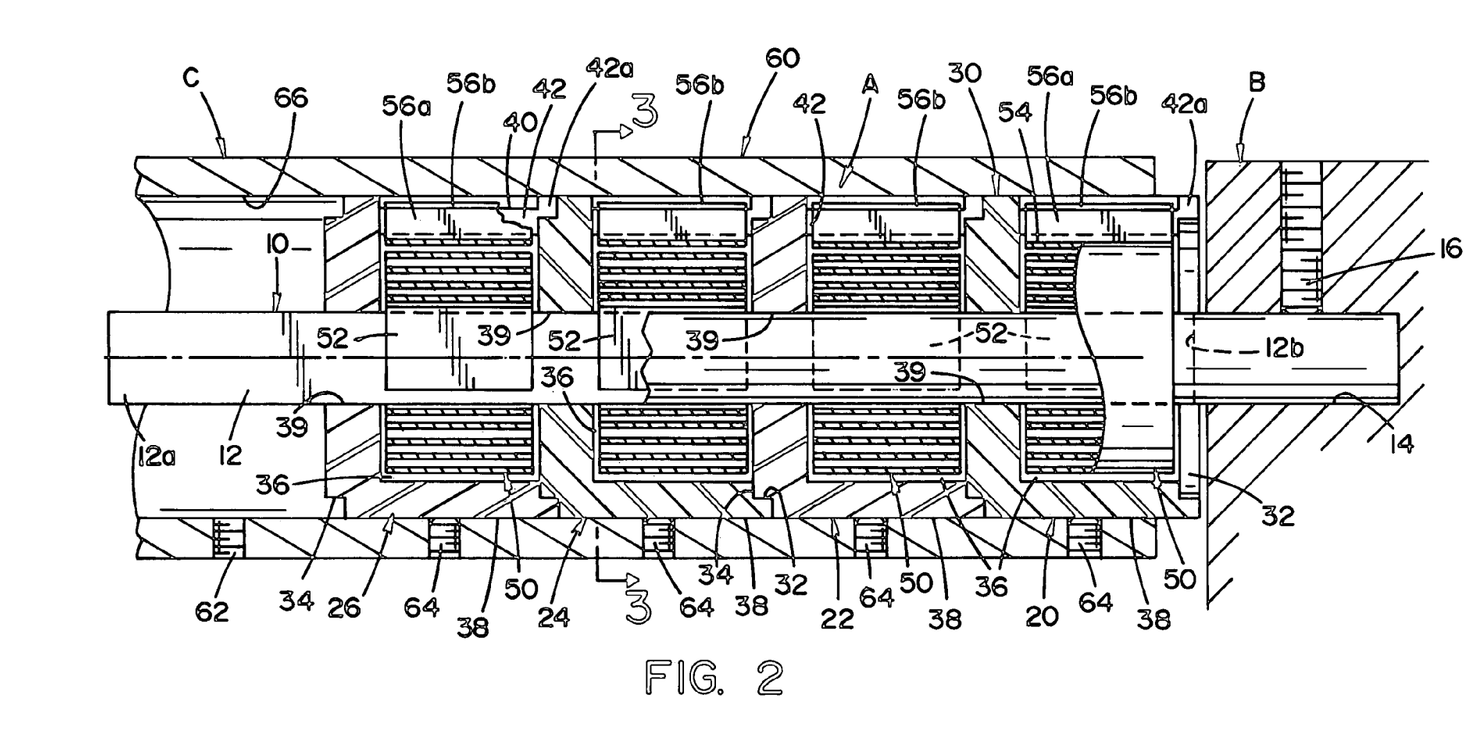
FIG. 2 is an enlarged cross-sectional view taken generally along line 2-2 of FIG. 1.
Figure 4:
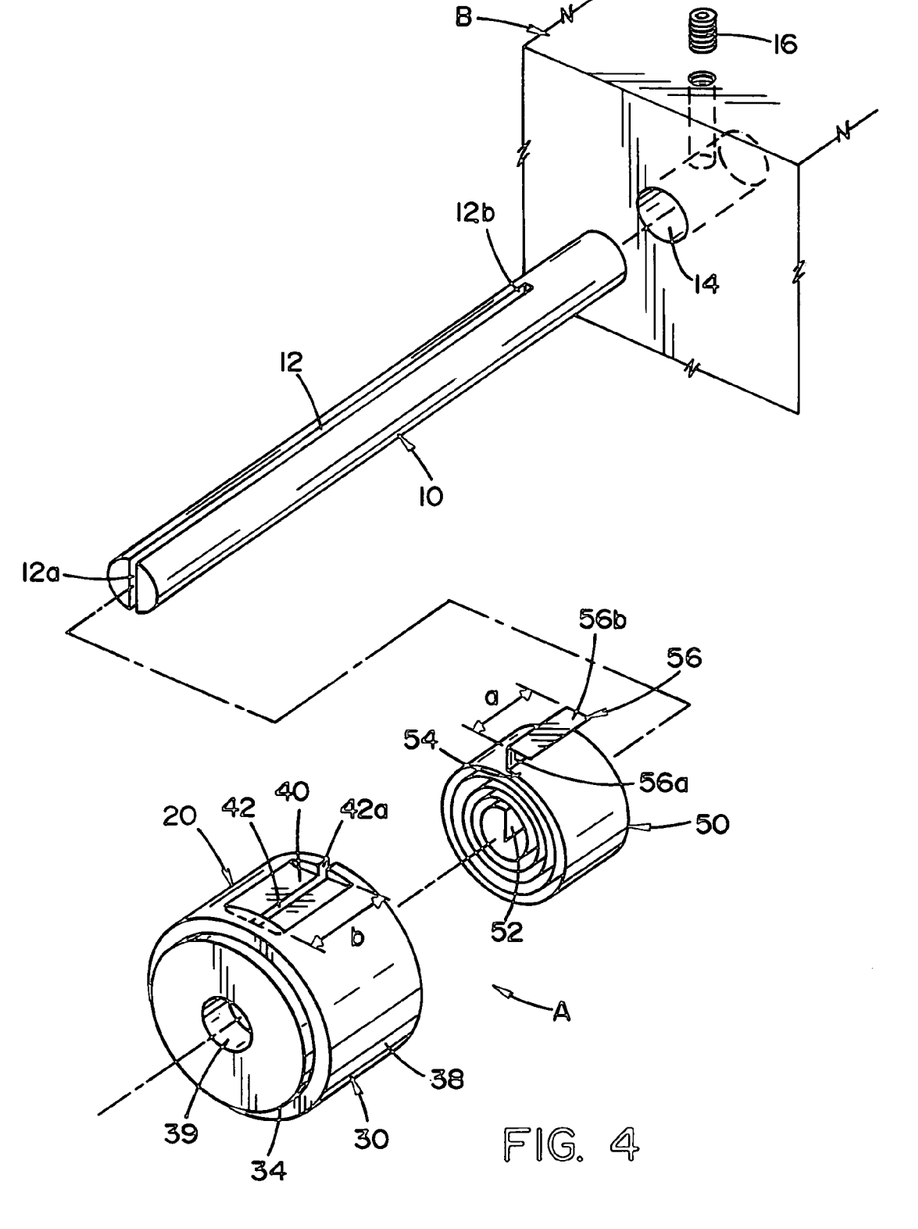
FIG. 4 is an exploded pictorial view illustrating the mounting of a single force unit onto a fixed structure as the initial step in constructing the embodiment of the invention illustrated in FIGS. 1-3.

In FIGS. 1-4, device A is constructed in accordance with the present invention for creating rotational biasing between fixed structure B, which is in practice an automobile sidewall of a cargo area and a roller tube C of a security shade used to cover the cargo area. Device A is used to create a rotational biasing force to wind a security shade onto roller tube C as the tube is rotated counterclockwise by using parallel torsion springs, as shown in FIG. 3. The center, axially extending fixed member of device A is shaft 10 having a transverse slot 12 with an open end 12a and a closed end 12b. Opening 14 in fixed side mounting structure B receives the end of shaft 12 which is secured with respect to structure B by an appropriate set screw 16. Onto shaft 12 is mounted a plurality of force units 20, 22, 24 and 26, each of which is substantially identical and the number in device A can be increased or decreased to change the biasing force between fixed structure B and roller tube C. Of course, another device A is located on the opposite side of the cargo area so roller tube C extends across the cargo area and is biased by two devices A, with one device on opposite ends of roller tube C. The actual security shade wrapped on the roller tube is a common component and is not illustrated. Since each force unit 20, 22, 24 and 26 is the same, only unit 20 will be described and this description will apply equally to the other units. The number for parts of the units are the same. Support cup 30 has a forwardly facing counter bore 32 and a rearwardly extending boss 34. These cylindrical components match each other so that boss 34 fits into bore 32 as best shown in FIG. 2 for aligning a number of force units on shaft 10 and inside tube C. Generally flat surface 40 defines a cavity intersecting slot 42, which slot extends from the boss end of cup 30 toward its counter bore end. Slot 42 has access end 42a. In this manner, slot 42 receives one end of torsion spring 50 so the torsion spring is inserted into spring cavity 36 of cup or housing 30. Torsion spring 50 is formed from a flat spring steel metal with a first end 52 formed into a straight portion for insertion into slot 12 of shaft 10 from end 12a. Before that assembly takes place, second end 54 of spring 50 having a tab 56 with a radially extending straight portion 56a is fitting into slot 42. A bent retainer 56b of tab 56 fits into the outer recess cavity caused by flat surface 40. Torsion spring 50 is first placed into the cavity 36 of cup or housing 30 by attaching its second end 54 at tab 56 onto the spring housing, as best shown in FIGS. 3 and 4. Then, force unit 20 is mounted onto fixed shaft 10 by sliding straight end 52 onto slot 12 from end 12a. The plurality of force units are assembled in parallel by first mounting torsion spring 50 into cup 30. Retainer 56b has a width a generally matching and slightly smaller than width b of flat surface 40. Thus, spring 50 is inserted into and retained on housing 30. Thereafter, the force unit is mounted in parallel on shaft 10 by inserting straight portion 52 in slot 12. Each end of tube C includes end housing portion 60 with an inner cylindrical surface 66. Support cups 30 have outer cylindrical surfaces 38 slightly less in diameter than surface 66 so units 20, 22, 24 and 26 freely slide into housing portion 60.

Figure 2A:
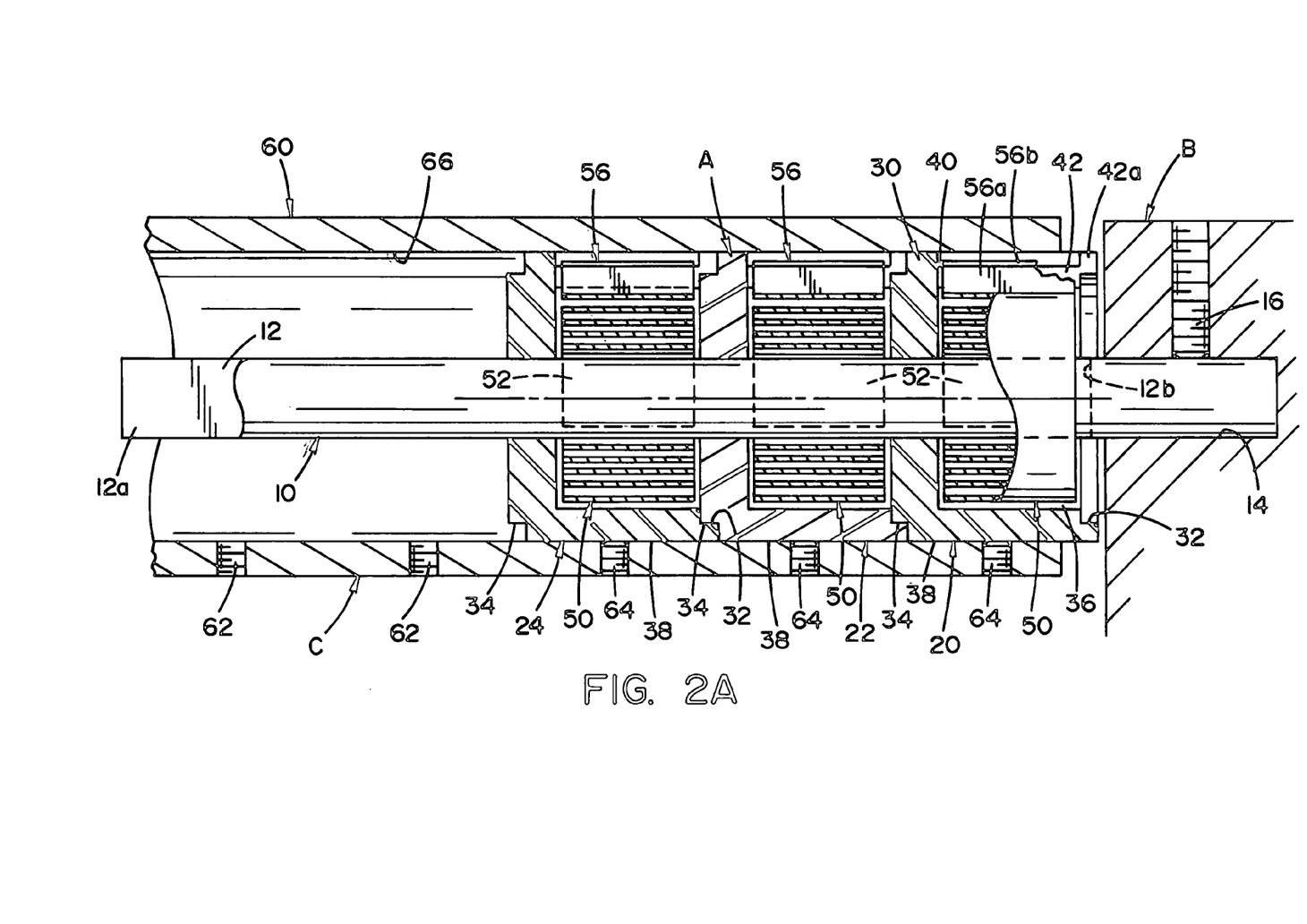
FIG. 2A is a view similar to FIG. 2 illustrating a change in the number of force units.

As illustrated in FIG. 4, the first assembly step for the parallel spring embodiment involves placing the torsion spring 50 of first force unit 20 into the cup or housing 30. Tab 56 slides through access end 42a of slot 42 until the tab is captured in flat portion 40 so torsion spring 50 has its second end 54 secured to housing 30. Then, force unit 20 is slipped onto shaft 10 with flat first end 52 sliding into slot 12 of the shaft. The fixed shaft protrudes outwardly through opening 39 of housing 30 for receiving next force unit 22 having its torsion spring 50 already assembled into the next cup 30. Additional parallel force units 24 and 26 are then assembled onto shaft 10. This is accomplished in the same manner. With the four parallel force units in place, the units are then slid into tube C and locked onto the tube by set screws 64 in threaded openings 62. In FIG. 2, four force units are affixed to tube C so that the total biasing force is the summation of the torsion forces in the four separate units. In practice, each unit has the same coefficient of torsion force. First end 52 of each spring in parallel force units 20, 22, 24 and 26 is secured to fixed structure B by way of slotted shaft 10. Second ends 54 of the torsion springs are connected to roller tube C by way of housing 30 and set screw 64. Opening 39 has a diameter greater than shaft 10 so that cup 30 can easily rotate on the shaft through the parallel configured torsion springs as shown in FIGS. 1-4. The basic feature of the present invention is illustrated in FIG. 2A where only three parallel force units 20, 22 and 24 are used to mount tube C onto fixed structure B. Thus, the torsion force on tube C is three-fourths the amount of biasing force created by the structure illustrated in FIG. 2. By adding or subtracting parallel force units based on torsion springs, the amount of biasing force can be adjusted easily by merely changing the number of units at each end of tube C. Indeed, the number of parallel force units at either end of tube C could be different; however, this parallel spring device is not the preferred implementation of the invention. By merely changing the number of parallel force units, the biasing force on the tube is adjusted. If the angular rotation to unwind the shade is to be increased, the series spring version of the invention is used and will be described in connection with FIGS. 5-8. Adjustment of force or amount of rotation is not possible in prior units such as shown in Price U.S. Pat. No. 5,934,354. The present invention, whether the parallel version or the series version, requires no common housing for all springs but only separate force units individually mounted and operated by the roller tube. Cup 30 is only a mounting member and not an enclosure or housing.

Figures 5, 7:
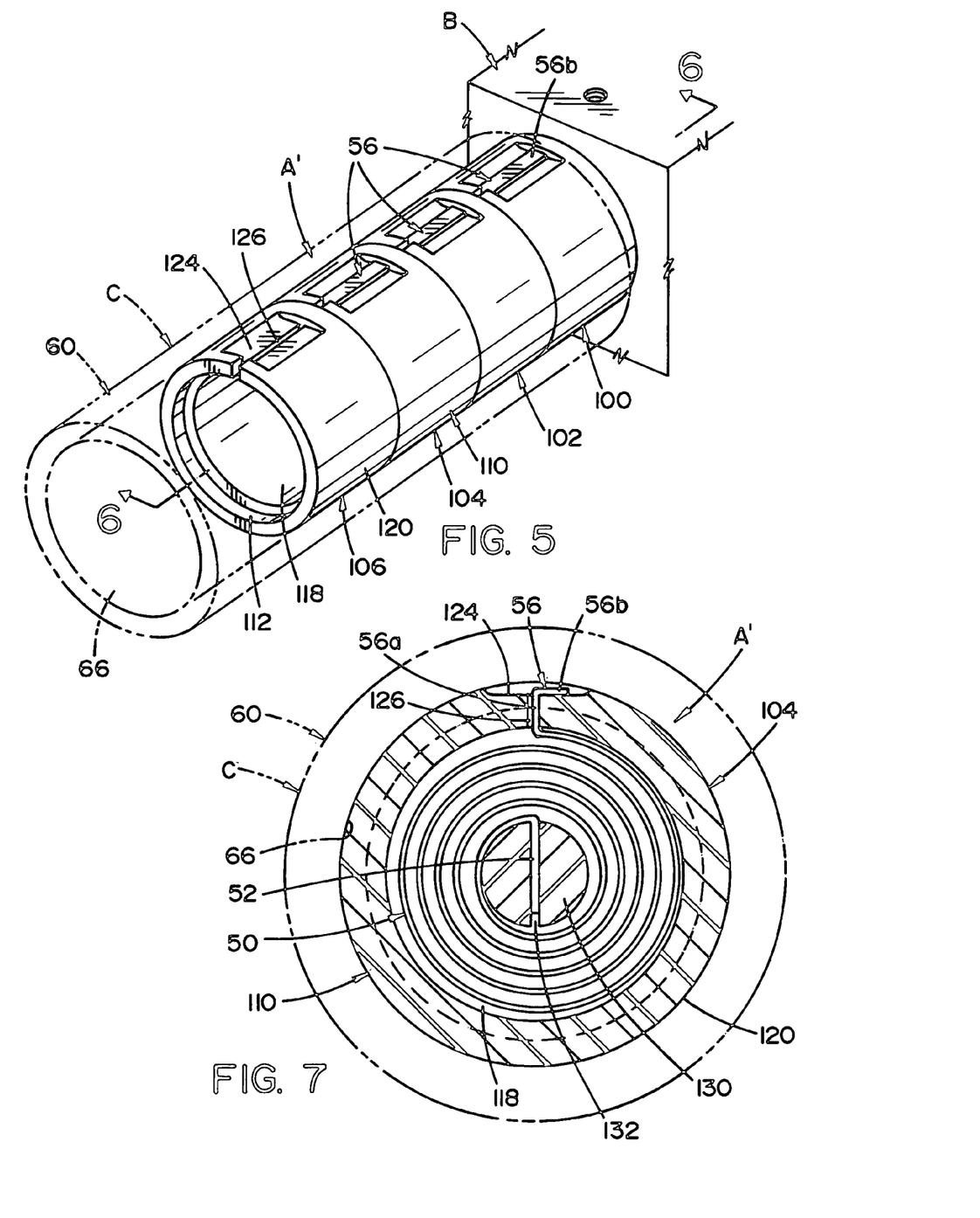
FIG. 5 is a pictorial view of the second embodiment of the present invention wherein the force units are connected in series.
FIG. 7 is an enlarged cross-sectional view taken generally along line 7-7 of FIG. 6; and, FIG. 8 is an exploded view illustrating the mounting of the first force unit in the embodiment of the invention illustrated in FIGS. 5-7.
Figure 6:
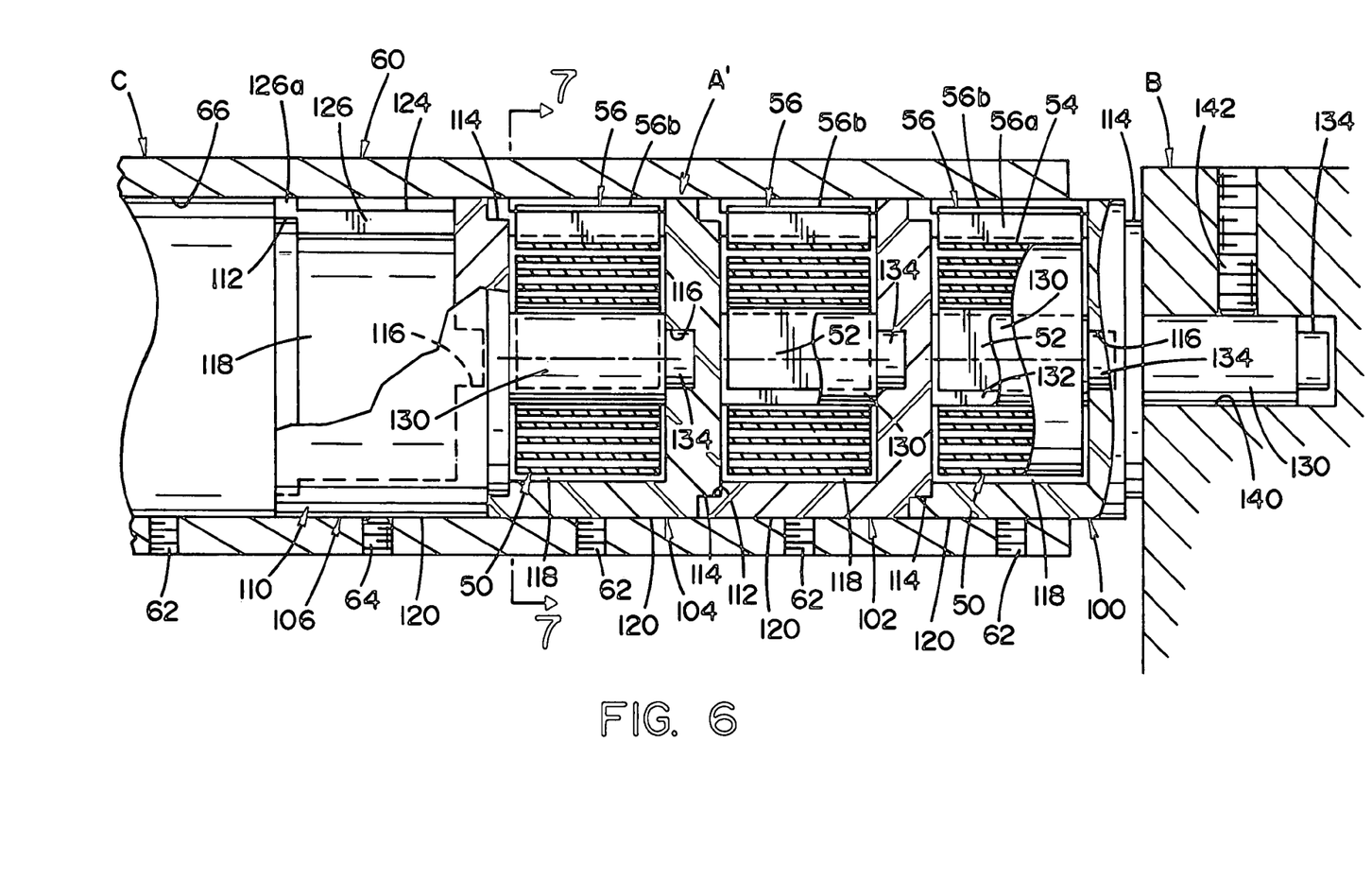
FIG. 6 is an enlarged cross-sectional view taken along line 6-6 of FIG. 5.
Figure 8:
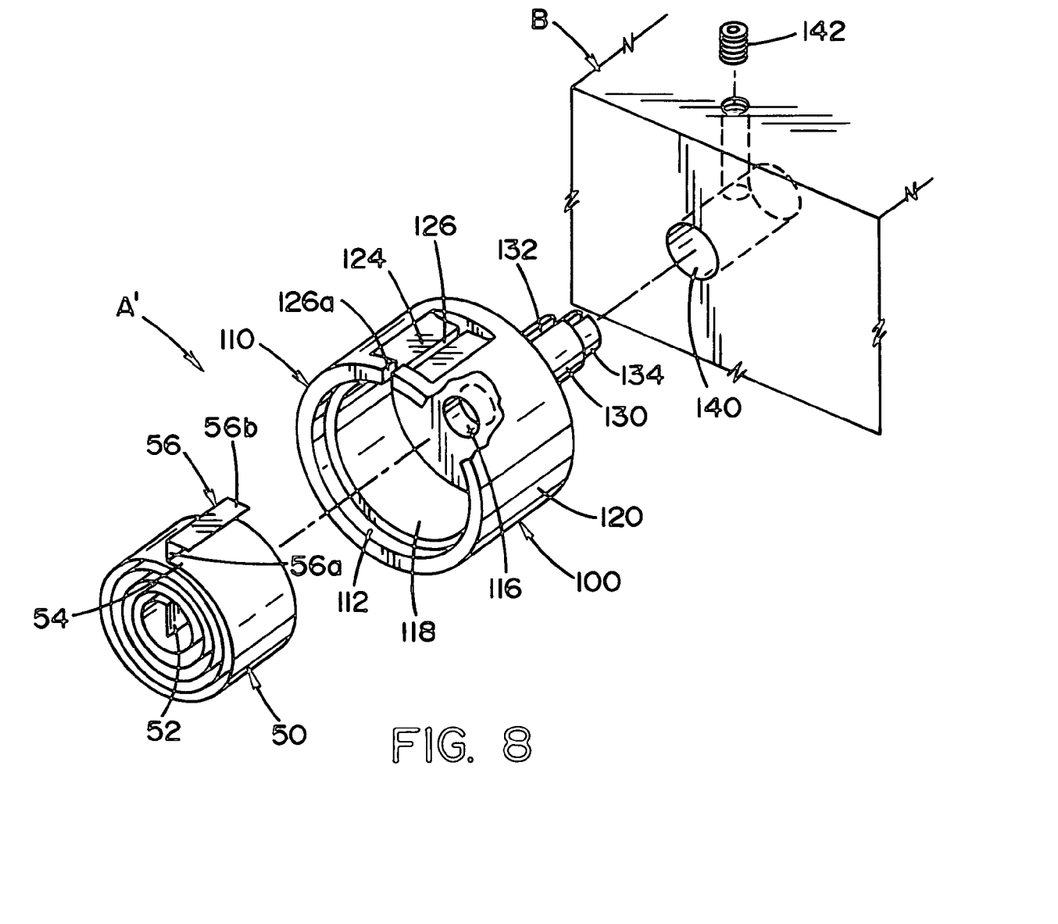

The preferred embodiment of the invention does not use the parallel connected force units as shown in FIGS. 1-4. To the contrary, the preferred implementation is device A' shown in FIGS. 5-8 uses a plurality of series connected torsion springs. This concept allows adjustment of the rotational angle during the unwinding of the shade. The actual torsion spring of device A' is essentially the same as the previously described torsion spring 50 used in the parallel spring version of the invention. In this second version, force units 100, 102 and 104 are connected in series with a terminal connector unit 106 connecting the stack of force units onto end housing 60. Since series connected force units 100, 102 and 104 are structurally the same, only one of these units needs to be described. This description applies to the other force units arranged in series with connector unit 106. Torsion spring 50 is used in series units 100, 102 and 104. The force units have a cup 110. This same cup is used for fastener or connector unit 106. Cup 110 includes a counter bore 112 and boss 114 which fit together for aligning the units about the same axis. Opening 116 receives the nose 134 of an adjacent slotted shaft 130 after the various units have been assembled in series. Cup 110 has central cavity 118 for receiving torsional springs 50 and an outer cylindrical surface 120. From one end of cup 110 there is a mounting shaft 130 having a slot 132 and terminal small cylindrical nose 134. This nose fits into opening 116 of the prior force unit. Nose 134 rotates in opening 116. As in the first embodiment, cup 110 has outer flat surface 124 with a radial slot 126 having an access end 126*a* so spring 50 can be assembled onto unit 100 (102, 104) by tab 56 fitting into slot 126, as best illustrated in FIG. 8. After spring 50 is assembled onto housing 110 of unit 100, shaft 130 is inserted into opening 140 of fixed structure B. As shown in FIGS. 6 and 8, set screw 142 then locks the first cup 110 onto structure B. The structure of force unit 100 is shown in FIG. 8. This same structure is used for force units 102, 104 that are assembled in series as shown in FIG. 6. For simplicity and cost reduction connector unit 106 merely employs a spring cup 110 having a forwardly extending shaft 130 with a nose 134 extending into opening 116 of the bottom portion of force unit 104. First end 52 of the three torsion springs are received in slot 132 of the successive cups 110, as shown in FIGS. 6 and 7. Thus, units 100, 102 and 104 are connected in series to exert a summation of forces between structure B and the empty cup 110 comprising the connector unit 106. This cup is affixed to end housing 60 by set screw 64. The rotational angle is the sum of the angle of each spring unit. Outer surfaces 120 of units 100, 102, 104, and 106 are slidably received within cylindrical surface 66 of end housing 60 of roller tube C. Force is transmitted from structure B by way of series connected tab 56 to first end 52 of the first torsion spring and then from that end to tab 56 and then end 52 of the next torsion spring end of unit 102. From there, force is exerted between tab 56 and end 52 of unit 104. From there, force is exerted through connector unit 106 directly to roller tube C. Thus, the same spring receptacle or cup is used for all force creating units. At the last unit, for cost reasons, the same cup structure is used to transmit force from end 52 of the last torsion spring directly to roller tube C. Other structures could be used for the terminal connector unit so long as the force units are connected in series and have a total angular movement equaling the summation of the torsion forces of the series connected force units.

Figure 6A:
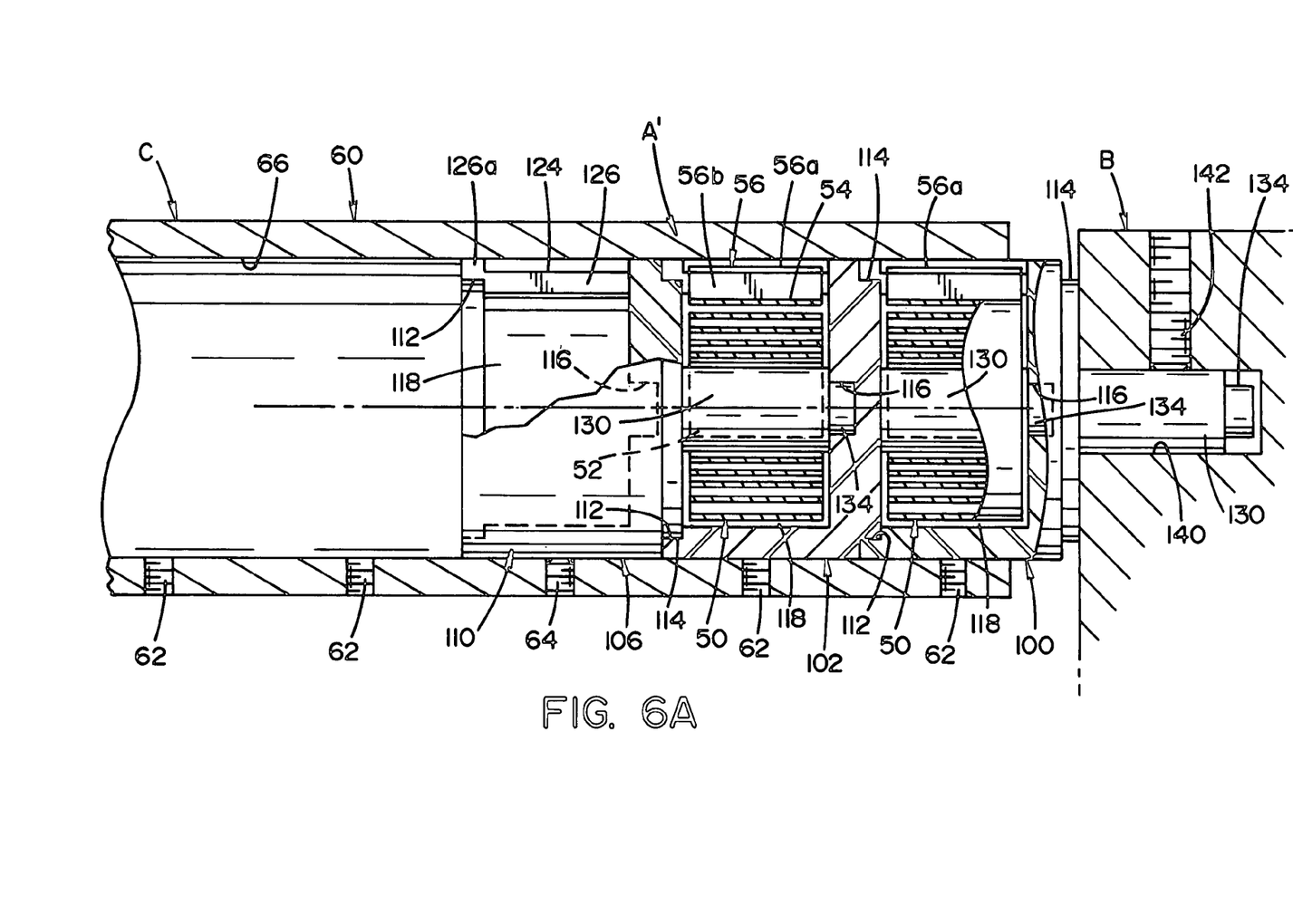
FIG. 6A is a view similar to FIG. 6 with the number of force units changed in accordance with the invention.

The embodiment of the invention shown in FIGS. 1-4 connects the torsion springs in parallel. Preferred embodiments of the invention shown in FIGS. 5-8 use essentially the same type of structures, but are slightly modified so that the housing of one unit is rotatable with respect to the housing of the adjacent units. An advantage of the structure shown in FIGS. 5-8 is illustrated in FIG. 6A. To reduce the total angle, only two series connected force units 100, 102 are used in device A'. Any number of series connected force units having the structure so far described, can be connected in device A' to provide a selected rotational angle.

The first embodiment of the invention involves connecting torsion springs in parallel. The second and preferred embodiment involves connecting the torsion springs in series. The number of springs in each of these units can be varied so that a standard force unit is manufactured and the amount of torsional force or angular rotation is adjusted by the number of force units assembled into the device for creating the angular biasing force.

Having thus defined the invention, the following is claimed:

1. A device for creating an angular biasing force for a roller tube of a security shade, which roller tube is mounted to a fixed structure of a vehicle, said device comprising a single shaft attached to said fixed structure of the vehicle and a plurality of independent modular force units having substantially a same size and shape that are positioned on said single shaft, a plurality of said force units positioned inside of a cavity of said roller tube, each of said force units including a housing and a torsion spring, said housing of a plurality of said force units having substantially a same size and shape, said housing of each of said force units designed to be inserted onto one end of said single shaft and slidably positioned along a longitudinal length said single shaft, said housing of each of said force units at least partially encircling said torsion spring, said single shaft secured to said fixed structure such that said single shaft does not rotate relative to said fixed structure, said torsion spring in each of said force units designed to exert a biasing force between said fixed structure and said roller tube, each of said torsion springs having a first inner end slidably connected said single shaft and a second outer end connected to said housing of said force unit, each of said housings rotatably positioned on said single shaft, said cavity of said roller tube including an inner surface, said inner surface designed to engage an outer surface of said housing of a plurality of said force units, said roller tube including a fastener designed to secure said roller tube to said housing of said plurality of said force units, said housing of said force units including an outer surface, at least one of said housings includes a recessed surface in said outer surface that is positioned adjacent to said housing slot in said housing, at least a portion of said second end of at least one of said torsion springs is positioned in said recessed surface.

2. The device as defined in claim 1, wherein said torsion springs of a plurality of force units are connected from said first end to said second end in series to increase a magnitude of angular rotation.

3. The device as defined in claim 2, wherein said cavity of said roller tube has an inner cylindrical surface and said housing of a plurality of said force units has an outer cylindrical surface designed to be slidable in said inner cylindrical surface of said cavity.

4. The device as defined in claim 2, wherein said biasing force is in a direction of winding said shade on said roller.

5. The device as defined in claim 4, wherein said cavity of said roller tube has an inner cylindrical surface and said housing of a plurality of said force units has an outer cylindrical surface designed to be slidable in said inner cylindrical surface of said cavity.

6. The device as defined in claim 4, wherein said cavity of the roller tube has an inner cylindrical surface and each of said housing of said force units has an outer cylindrical surface designed to be slidably positionable in said inner cylindrical surface.

7. The device as defined in claim 6, wherein said cavity of the roller tube has an inner cylindrical surface and each of said housing of said force units has an outer cylindrical surface designed to be slidably positionable in said inner cylindrical surface.

8. The device as defined in claim 1, wherein a plurality of said force units are connected in parallel relationship to said roller tube to increase an angular force, said housing of a plurality of said force units connected to said roller tube such that said housing and said roller tube do not independently rotate relative to one another.

9. The device as defined in claim 8, wherein said cavity of said roller tube has an inner cylindrical surface and said housing of a plurality of said force units has an outer cylindrical surface designed to be slidable in said inner cylindrical surface of said cavity.

10. The device as defined in claim 8, wherein said biasing force is in a direction of winding said shade on said roller.

11. The device as defined in claim 10, wherein said cavity of said roller tube has an inner cylindrical surface and said housing of a plurality of said force units has an outer cylindrical surface designed to be slidable in said inner cylindrical surface of said cavity.

12. The device as defined in claim 1, wherein said biasing force is in a direction of winding said shade on said roller.

13. The device as defined in claim 1, wherein said cavity of said roller tube has an inner cylindrical surface and said housing of a plurality of said force units has an outer cylindrical surface designed to be slidable in said inner cylindrical surface of said cavity.

14. The device as defined in claim 13, wherein said cavity of the roller tube has an inner cylindrical surface and each of said housing of said force units has an outer cylindrical surface designed to be slidably positionable in said inner cylindrical surface.

15. A device for creating an angular biasing force between a fixed structure and an elongated member rotatably connected to said structure, said fixed structure including a single shaft that is non-rotatably securable to said fixed structure, said device rotatable about a longitudinal axis of said single shaft, said device including a plurality of independent modular force units slidably positionable along a longitudinal axis of said elongated member, a plurality of said force units positioned inside of a cavity of said elongated member, each of said force units including a housing, said housing of each of said force units designed to be inserted onto one end of said single shaft and designed to be slidably positioned along a longitudinal length said single shaft, a plurality of said housing of said force units including at least one torsion spring, a plurality of said housings of said force units having substantially a same shape and size, a plurality of said housings of said force units substantially encircling said at least one torsion spring, each of said torsion springs in a plurality of said force units designed to exert a biasing force between said fixed structure and said elongated member, at least one of said torsion springs of said plurality of said force units having a first inner end slidably connected to said single shaft and a second outer end connected to said housing of said force unit, each of said housings of said force units rotatably positioned on said single shaft, said elongated member and at least one of said force units includes a connection arrangement to connect at least one of said housings of said force units to said elongated member to prevent said slidable movement of said force unit along said longitudinal length of said elongated member, said housing of said force units including an outer surface, at least one of said housings includes a recessed surface in said outer surface that is positioned adjacent to said housing slot in said housing, at least a portion of said second end of at least one of said torsion springs is positioned in said recessed surface.

16. The device as defined in claim 15, wherein at least a portion of at least one of said torsion springs in each of said housings of said force units is formed from convolutions of flat spring metal coil that are designed to be concentrically positioned around said longitudinal axis of said single shaft.

17. The device as defined in claim 15, wherein at least two of said torsion springs in a plurality of said housings of said force units having essentially the same torsion coefficient of elasticity.

18. The device as defined in claim 17, wherein said device has more than two force units positioned on said single shaft.

19. The device as defined in claim 18, wherein said single shaft includes a slot along said longitudinal length of said single shaft, said first end of at least one of said torsion springs in said plurality of said housings of said force units is slidably positionable in said slot so as to allow for said slidable connection between said torsion spring said single shaft.

20. The device as defined in claim 19, wherein said elongated member is a roller tube for a security shade.

21. The device as defined in claim 20, wherein at least one of said housings of said force units includes a housing slot, said second end of at least one of said torsion springs is positionable in said housing slot to enable said torsion spring to be connected to said housing.

22. The device as defined in claim 21, wherein said housing of at least one of said force units includes a boss that is at least partially positioned in a housing recess of an adjacently positioned force unit when said force units are positioned on said single shaft.

23. The device as defined in claim 22, wherein a housing cavity of said housing having a circular cross-section shape and an outer perimeter of said housing having a circular cross-sectional shape, said cavity of said elongate member having a circular cross-sectional shape.

24. The device as defined in claim 23, wherein a plurality of said torsion springs connected in a parallel relationship.

25. The device as defined in claim 24, wherein at least a portion of at least one of said torsion springs in each of said housings of said force units is formed from convolutions of flat spring metal coiled that are designed to be concentrically positioned around said longitudinal axis of said single shaft.

26. The device as defined in claim 15, wherein said device has more than two force units positioned on said single shaft.

27. The device as defined in claim 15, wherein said single shaft includes a slot along said longitudinal length of said single shaft, said first end of at least one of said torsion springs in said plurality of said housings of said force units is slidably positionable in said slot so as to allow for said slidable connection between said torsion spring said single shaft.

28. The device as defined in claim 15, wherein said elongated member is a roller tube for a security shade.

29. The device as defined in claim 15, wherein at least one of said housings of said force units includes a housing slot, said second end of at least one of said torsion springs is positionable in said housing slot to enable said torsion spring to be connected to said housing.

30. The device as defined in claim 15, wherein said housing of at least one of said force units includes a boss that is at least partially positioned in a housing recess of an adjacently positioned force unit when said force units are positioned on said single shaft.

31. The device as defined in claim 15, wherein a housing cavity of said housing having a circular cross-section shape and an outer perimeter of said housing having a circular cross-sectional shape, said cavity of said elongate member having a circular cross-sectional shape.

32. The device as defined in claim 15, wherein a plurality of said torsion springs connected in a parallel relationship.

33. A device for creating an angular biasing force between a fixed structure and an elongated member rotatably connected to said structure, said fixed structure including a shaft that is non-rotatably securable to said fixed structure, said device rotatable about an axis of said shaft, said device including a plurality of independent modular force units slidably positionable along a longitudinal axis of said elongated member, a plurality of said force units slidably positionable on said shaft, a plurality of said force units positioned inside of a cavity of said elongated member, each of said force units including a housing, a plurality of said housing including at least one torsion spring, a plurality of said housings having substantially a same shape and size, a plurality of said housing substantially encircling said at least one torsion spring, each of said torsion springs in a plurality of said force units designed to exert a biasing force between said fixed structure and said elongated member, at least one of said torsion springs of said plurality of said force units having a first inner end connected to said shaft and a second outer end connected to said housing of said force unit, each of said housings of said force units rotatably positioned on said shaft, said elongated member and at least one of said force units includes a connection arrangement to connect at least one of said housings of said force units to said elongated member to prevent said slidable movement of said force unit along said longitudinal length of said elongated member, at least one of said housings of said force units includes a housing slot, said second end of at least one of said torsion springs is positionable in said housing slot to enable said torsion spring to be connected to said housing, said housing of said force units includes an outer surface, at least one of said housings includes a recessed surface in said outer surface that is positioned at least closely adjacent to said housing slot in said housing, at least a portion of said second end of at least one of said torsion springs is positioned in said recessed surface.

34. A device for creating an angular biasing force between a fixed structure and an elongated member rotatably connected to said structure, said fixed structure including a single shaft that is non-rotatably securable to said fixed structure, said device rotatable about a longitudinal axis of said single shaft, said device including a first and second force units designed to be independently positionable on said single shaft, each of said first and second force units positioned inside of a cavity of said elongated member, each of said first and second force units including a housing and at least one torsion spring, said housings of said first and second force units having substantially a same shape and size, said housings of said first and second force units designed to be slidably positionable along a longitudinal length of said single shaft, each said housings of said first and second force units substantially encircling said at least one torsion spring, each of said torsion springs in said first and second force units designed to exert a biasing force between said fixed structure and said elongated member, said torsion springs of each of said first and second force units having a first inner end slidably connected to said single shaft and a second outer end connected to said housing of said first and second force units, each of said housings of said first and second force units rotatably positioned on said single shaft, said elongated member connected to said housing of said first force unit, at least one of said housings of said first and second force units includes a boss that is at least partially positioned in a housing recess in said housing of an adjacently positioned force unit so as to orient said adjacently positioned force units relative to one another in first and second said cavity of said first and second force units when said first and second force units are positioned on said single shaft, said housing of said force units including an outer surface, at least one of said housings includes a recessed surface in said outer surface that is positioned adjacent to said housing slot in said housing, at least a portion of said second end of at least one of said torsion springs is positioned in said recessed surface.

35. The device as defined in claim 34, wherein said device has more than two force units.

36. The device as defined in claim 35, wherein said single shaft includes a slot along said longitudinal axis, said first end of at least one of said torsion springs in each of said housings of said first and second force units is postionable in said slot so as to allow for said slidable connection between said torsion spring said single shaft.

37. The device as defined in claim 36, wherein each of said housings of said first and second force units includes a housing slot, said second end of at least one of said torsion springs is positionable in said housing slot to enable said torsion spring to be connected to said housing.

38. The device as defined in claim 37, wherein at least one of said housing of said first and second force units includes a housing recess and at least one of said housing of said first and second force units includes a boss, said boss on at least one of said housing of said first and second force units at least partially positioned in said housing recess when a plurality of said force units are positioned on said shaft.

39. The device as defined in claim 38, wherein a housing cavity of said housings of said first and second force units having a circular cross-section shape and an outer perimeter of said housing having a circular cross-sectional shape, said cavity of said elongate member having a circular cross-sectional shape.

40. The device as defined in claim 34, wherein said single shaft includes a slot along said longitudinal axis, said first end of at least one of said torsion springs in each of said housings of said first and second force units is postionable in said slot so as to allow for said slidable connection between said torsion spring said single shaft.

41. The device as defined in claim 34, wherein each of said housings of said first and second force units includes a housing slot, said second end of at least one of said torsion springs is positionable in said housing slot to enable said torsion spring to be connected to said housing.

42. The device as defined in claim 34, wherein at least one of said housing of said first and second force units includes a housing recess and at least one of said housing of said first and second force units includes a boss, said boss on at least one of said housing of said first and second force units at least partially positioned in said housing recess when a plurality of said force units are positioned on said shaft.

43. The device as defined in claim 34, wherein a housing cavity of said housings of said first and second force units having a circular cross-section shape and an outer perimeter of said housing having a circular cross-sectional shape, said cavity of said elongate member having a circular cross-sectional shape.

44. A device for creating an angular biasing force between a fixed structure and an elongated member rotatably connected to said structure, said fixed structure including a shaft that is non-rotatably securable to said fixed structure, said device rotatable about an axis of said shaft, said device including a first and second force units designed to be independently positionable on the shaft, said first and second force units designed to be slidably positionable along a longitudinal length of said shaft, each of said force units positioned inside of a cavity of said elongated member, each of said force units including a housing and at least one torsion spring, said housings of said first and second force units having substantially a same shape and size, said housing substantially encircling said at least one torsion spring, each of said torsion springs in each of said first and second force units designed to exert a biasing force between said fixed structure and said elongated member, at least one of said torsion springs of each of said first and second force units having a first inner end connected to said shaft and a second outer end connected to said housing of said force unit, each of said housings of said first and second force units rotatably positioned on said shaft, said elongated member connected to said housing of said first force unit, at least one of said housings of said first and second force units includes a boss that is at least partially positioned in a housing recess in said housing of an adjacently positioned force unit so as to orient said adjacently positioned force units relative to one another in said cavity of said elongated member when said first and second force units are positioned on said shaft, each of said housings of said first and second force units includes a housing slot, said second end of at least one of said torsion springs is positionable in said housing slot to enable said torsion spring to be connected to said housing, said housing of said first and second force units includes an outer surface, at least one of said housings includes a recessed surface in said outer surface, at least a portion of said housing slot positioned in said recessed surface, at least a portion of said second end of at least one of said torsion springs positioned in said recessed surface.

* * * * *